Dec. 20, 1938.   C. P. WAGNER ET AL   2,140,974
TRAVELING SHELF OR ARTICLE CARRIER FOR TRUCK BODIES
Filed April 19, 1938   2 Sheets-Sheet 1
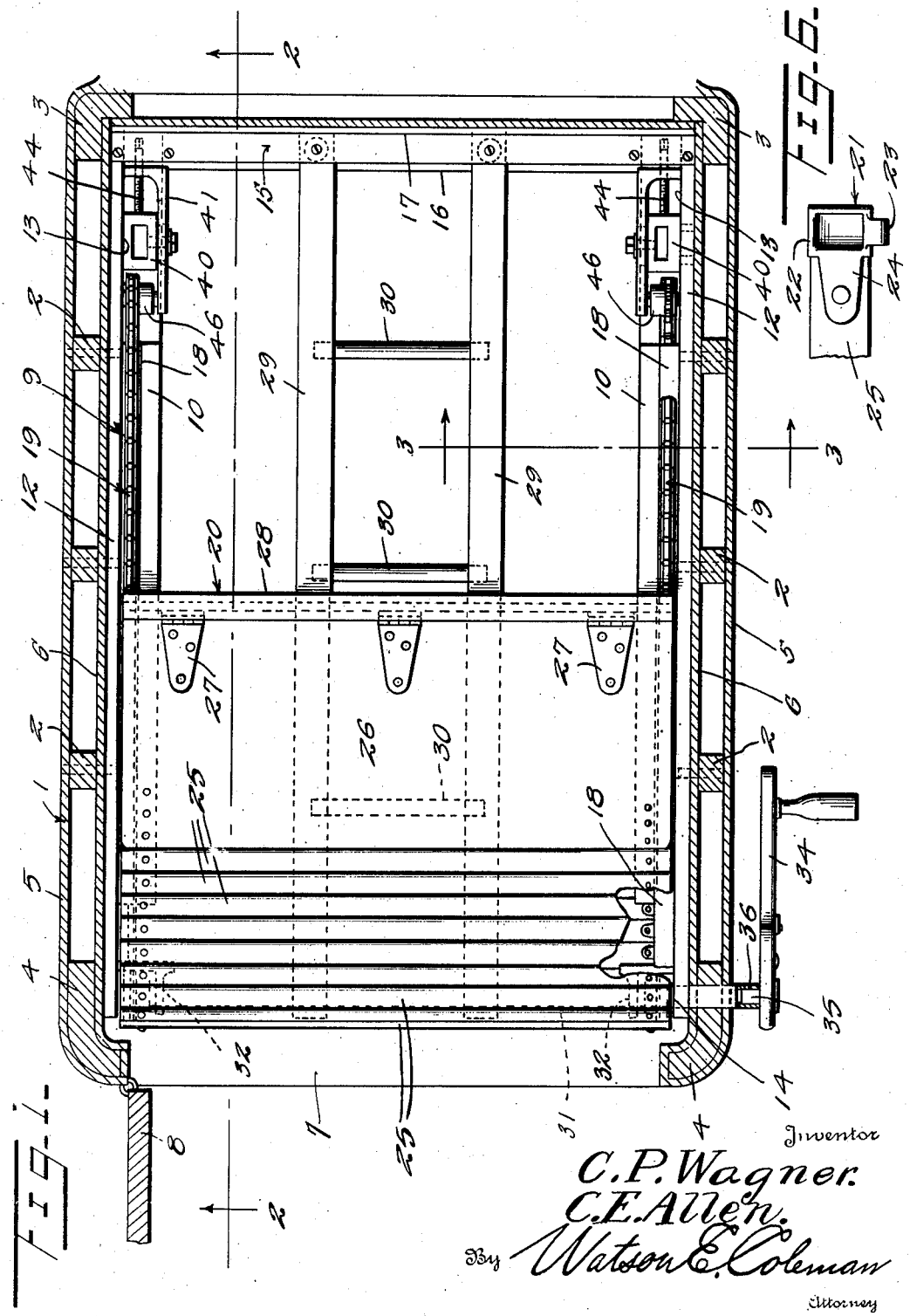
Inventor
C. P. Wagner.
C. E. Allen.
By Watson E. Coleman
Attorney

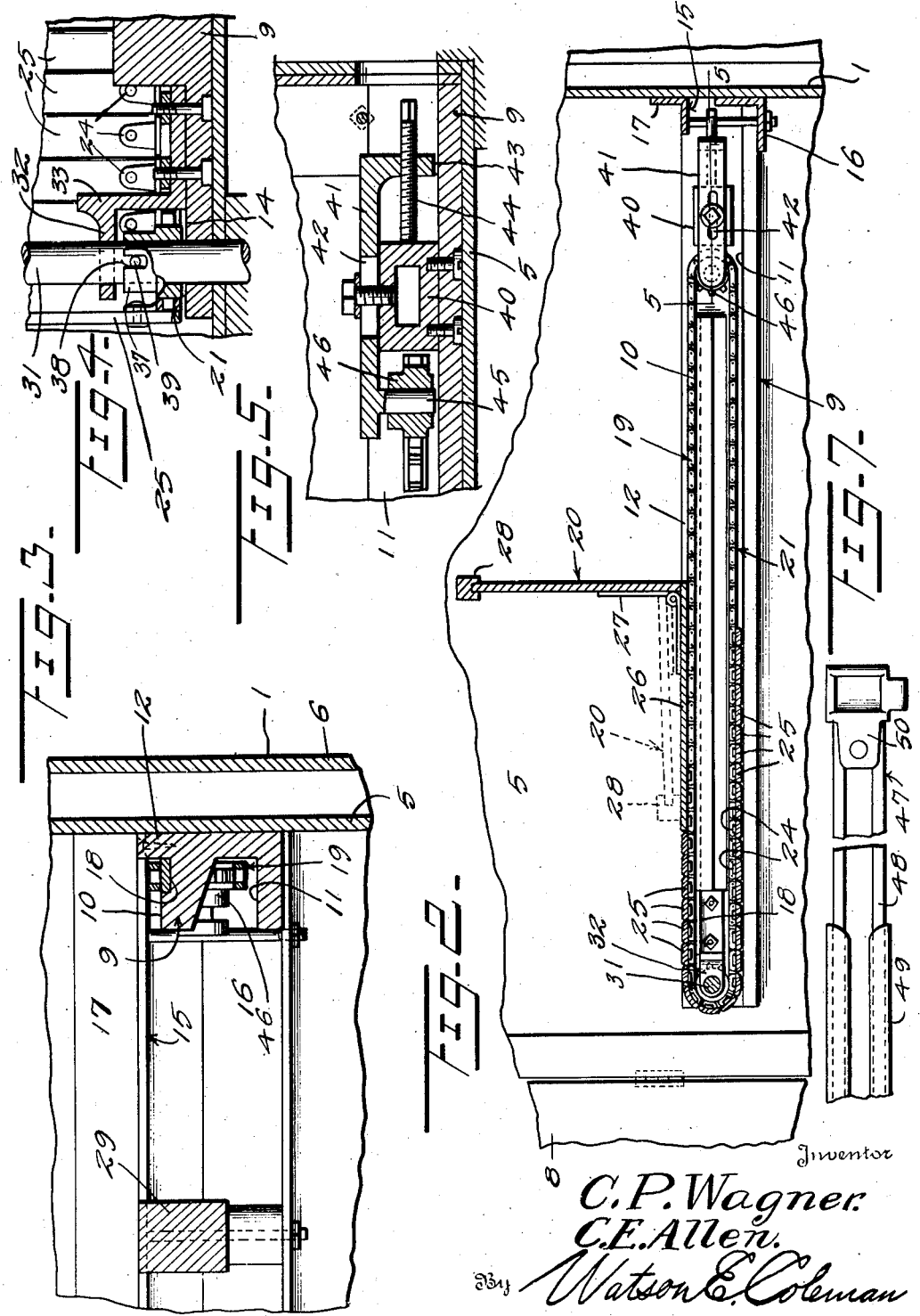

Patented Dec. 20, 1938

2,140,974

UNITED STATES PATENT OFFICE 2,140,974

TRAVELING SHELF OR ARTICLE CARRIER FOR TRUCK BODIES

Clyde P. Wagner and Clifford E. Allen, Joplin, Mo.

Application April 19, 1938, Serial No. 202,940

10 Claims. (Cl. 214—83)

This invention relates generally to movable supporting structures of the nature of shelves or racks and pertains particularly to a novel and improved sliding supporting structure designed primarily for use in delivery wagons.

The present invention has been designed primarily for use in bread delivery wagons, although it is to be understood that in referring to this particular type of delivery wagon, the invention is not to be regarded as limited to such use but may be used in any structure where it may be found suitable, and the primary object of the invention is to provide a movable supporting structure which is designed to facilitate the handling of the articles carried in the delivery wagon by making it possible for the delivery man to shift the articles remaining in the wagon toward the rear or outlet therefor as such articles are removed for delivery so that it will not be necessary for the delivery man to climb into the wagon to reach remaining articles or to use poles or other means for bringing such articles within convenient reach.

Another object of the invention is to provide an improved sliding or movable support for a delivery wagon which includes a slatted conveyor having a novel carrying means whereby the conveyor may be conveniently shifted and whereby also repairs may be easily and quickly made in the event of breakage of any of the slats making up the structure.

Still another object of the invention is to provide a movable conveyor shelf for wagons or other structures wherein a novel means is employed for maintaining the conveyor tight to prevent rattling of the parts.

Still another object of the invention is to provide a movable shelf structure of the character described comprising a slatted conveyor mounted upon endless sprocket chains, wherein a novel guide and supporting means is provided for each of said endless chains whereby a double supporting track for each chain carries the ends of the slats of the portion of the conveyor having a load thereon and also carries the ends of the slats of the portion of the conveyor which has been removed from use.

A still further object of the invention is to provide in a moving support or shelf of the character set forth, a novel means whereby automatic compensation is made for variations in the lengths of the slats of which the conveyor portion of the shelf is made up so as to insure smooth operation of the carrier.

Other objects and advantages of the invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expresed in the appended claims.

In the drawings:

Fig. 1 is a horizontal section through a delivery truck body showing in top plan therein the traveling shelf or article support embodying the present invention.

Fig. 2 is a longitudinal section taken upon the line 2—2 of Fig. 1.

Fig. 3 is a sectional view taken on the line 3—3 of Fig. 1.

Fig. 4 is an enlarged horizontal section through the supporting structure for an end of the shelf operating shaft showing the novel connection between the shaft and the sprocket gear.

Fig. 5 is a section taken substantially upon the line 5—5 of Fig. 2.

Fig. 6 is a detailed view of the underside of one end of a slat of the traveling shelf.

Fig. 7 is a view in bottom plan of a portion of a modified traveling shelf slat.

Referring now more particularly to the drawing, there is shown in Fig. 1, a horizontal section of a diagrammatically illustrated wagon or truck within which the movable shelf or floor structure embodying the present invention is mounted. This truck body is generally designated by the numeral 1 and the numeral 2 indicates the vertical side beams or joists which are ordinarily employed in the construction of truck bodies and to which the movable shelf or bottom structure is secured. At the front and rear ends of the truck are the corner posts 3 and 4, respectively, while the numerals 5 and 6 designate the outer and inner covering materials which are secured to the joists and corner posts. The door opening for the truck body is indicated by the numeral 7 and shown at the rear of the truck and is adapted to be closed by doors 8.

The structure embodying the present invention is designed to be installed into any already built truck or wagon body as well as to be built into such body at the time of its construction and it may form the bottom or floor for the truck or in association with like structures it may provide the truck floor and one or more shelves above the floor and extending throughout the length of the truck. This moving article supporting structure comprises the two parallel side beams 9 which are of the special construction hereinafter described whereby there are obtained the upper and lower parallel guides or tracks 10 and 11, respectively. Each of these beams is preferably formed of a single piece of material and the top face of each is cut down to form the guide 10 and leave the outside rail 12 while the inner face of each beam is grooved as illustrated in Fig. 3, to form the lower track 11, which lies directly below the upper guide or track 10. At the front and rear ends of each of the beams 9, the upper guide terminates short of the ends of the beams to leave the front and rear plates 13 and 14, respectively, each of these plates having a part of the conveyor structure secured thereto above the lower guide 11, as hereinafter described. The beams 9 are disposed within the truck body to extend longitudinally thereof as previously stated, and are secured to the end posts and joists 2, 3 and 4, so that they will be maintained rigidly in position, the grooved inner sides of the beams being in opposed relation, as illustrated.

Extending across and connecting the front ends of the beams 9 are the upper and lower angle bars 15 and 16, respectively, the upper angle bar being disposed with one flange upon the tops of the beams 9 and the other flange disposed vertically to provide a stop wall 17 for the movable portion of the traveling shelf or support as hereinafter described.

Countersunk into the top surface of each of the top guides 10 is a metal track 18 over which passes the upper run of the endless sprocket chain 19 which supports one longitudinal edge of the movable shelf structure which is indicated as a whole by the numeral 20. The sprocket chain 19 consists of the usual closed links 21 of which such chains are made up, each of the links having a bar 22 and a lip 23, the lip of one link being in detachable engagement with the bar of an adjacent link. In the present case, each of the links is provided with an integral laterally extending ear 24 and each of the slats 25 of which the major portion of the shelf is made up, has one of these ears riveted or otherwise suitably secured to each end thereof. At one end of the movable shelf structure 20 is a terminal board 26 to the underside of which are secured several of the links of each endless chain, by means of the ears 24 thereof, the chains passing across the ends of the board in the manner illustrated. The free transverse edge of the board 26 has hingedly attached thereto by the hinges 27, the back panel 28 which is adapted to be disposed in vertical position with respect to the horizontally arranged board 26, when material is piled upon the carrier 20 and when the carrier is loaded it will be disposed with the back panel 28 against the stop 17 of the angle iron 15 which extends transversely of the car or truck body at the front of the latter.

Extending longitudinally of the structure between the beams 9 are two supporting rails 29, the forward ends of which are secured between the angle beams 15 and 16, while the rear ends terminate in line with the ends of the guide beams 9 and are rounded to permit the movable shelf structure 20 to turn in passing from above the guide beams 9 to below the same or in the reverse order. Suitable cross dowels 30 connect the rails 29 to maintain the same rigidly in parallel relation and it will be seen that the top run of the carrier 20 rests upon these rails so that they support in association with the beams 9, the load which the movable carrier is supporting.

At the rear end of the structure a shaft 31 passes transversely through the ends of the rails 29 and is supported at each of its ends in the bearing arm 32 which forms an integral part of and is laterally or inwardly offset from the bracket plate 33 which is secured to the beam plate 14. At one end, this shaft 31 is extended through a suitable opening in the adjacent corner post 4 of the truck body and this extended end is formed in any suitable manner to facilitate the connection therewith of an operating crank 34, the crank here shown being of the type having a stud 35 which is adapted to engage in a socket 36 in the end of the shaft. It is also preferred that the crank be of the type having a ratchet connection between the stud 35 and the body of the crank whereby the necessary rotation may be given to the shaft 31 without having to fully rotate or turn the crank.

Upon each end of the shaft 31 there is mounted between the bearing 32 and the adjacent plate 14, the sprocket gear 37 which may be referred to as the driving gear and in the construction of the movable shelf structure where the slats 25 are of one-piece formation, the hub of each of these gears is provided with the edge slot 38 in which positions a pin 39 which is secured in the shaft 31, thus while the driving gear is positively attached to the shaft for rotation thereby, it is permitted slight movement longitudinally on the shaft and if the lengths of the slats 25 are not the same throughout the full extent of the movable carrier, the driving gears may shift slightly so as to permit the chains to move freely thereover without binding.

At the forward end of each of the beams 9, there is secured to the inner face of the plate 13 a block 40 and extending longitudinally of the structure across the inner face of this block is a longitudinally shiftable bar 41 having a longitudinally extending slot 42 therein and having the laterally turned end 43 which extends outwardly with respect to the vehicle body, between the adjacent block and the front end of the vehicle. This lateral extension of each bar has a threaded aperture therethrough to receive the adjusting or chain tensioning screw 44, the end of the screw abutting the adjacent block 40 as shown, so that when the screw is threaded through the bar extension toward the block, it will operate to shift the bar 41 longitudinally and forwardly with respect to the vehicle. Upon the end of each bar opposite from the extension 43 and upon the opposite side of the block 40 from this extension, is an outwardly directed pivot pin 45 on which is mounted a driven sprocket gear 46, the gear being maintained in place upon the pivot pin 45 by the adjacent wall of the plate 13.

From the foregoing, it will be readily apparent that in the set up traveling shelf structure, each of the endless chains 19 will be disposed to pass over a driven gear 46 and a driving gear 37 with the top run lying upon the track plate 18 and the lower or bottom run of the chain passing over and longitudinally of the bottom guide 11. It will, of course, be readily apparent that each of the bottom guides 11 will support the ends of the slats 25 of that portion of the movable carrier which is out of use and the free portion of the sprocket chain extending from the end 1 of the group of slats will then lie upon the guide surface 11 in the manner shown. The tightening or tensioning of the sprocket chains is effected through the manipulation of the screws 44 and each of the chains may be provided with one link in which the engaging lip is sufficiently open to permit its detachment from the bar of an adjacent link so that when the screws 44 are loosened so that the chains become slack, these links may be manipulated to break the chains and thus facilitate the removal of the sliding portion 20 of the structure when such is necessary.

In Fig. 7, there is shown a modified form of the slats described. In this form which is generally indicated by the numeral 47, there are the two telescopically joined portions 48 and 49, each of which carries upon its outer end a combined link and tongue unit 50 which is of the same construction as each of the links previously described and indicated by the numeral 21. With these telescoping forms of the slats replacing the one-piece slats 25, the use of the slotted driving gears 37 and the pins 39 is not necessary as it will be readily apparent that variations in the lengths of the slats occurring when the structure is assembled, will be changed automatically after the slats have once passed around the driving gears, by the two parts of the telescoping slats shifting relatively until the lengths of all of the telescoping slats are the same. Also by the provision of these adjustable slats, the device as a whole may be readily installed in different truck bodies where the interior widths of the bodies may vary.

From the foregoing, it will be readily apparent that the structure herein described may be readily installed in a delivery truck as it is only necessary to mount the spaced supporting beams 9 against the uprights or joists and the corner posts of the truck body and secure the beams thereto, the necessary provision having previously been made for the extended end of the operating shaft 31 by providing one of the corner posts of the body with the necessary opening to receive the extended end of this shaft. As previously stated, the present invention is not to be restricted in its use to bread delivery wagons but may be used in association with any vehicles wherein its use will be found of benefit. However, the device has been used successfully in bread delivery wagons or trucks and as a result it is possible to carry a greater number of loaves in the truck when the truck is equipped with traveling shelves of the character herein described and the loaves are stacked directly thereon, for the reason that the present method of handling loaves is to place them in receptacles and as the receptacles are emptied, they are pulled to the back of the truck by hooks or other handling means and it is not possible to obtain receptacles which can be packed into the truck without there being a certain amount of lost space, whereas when the loaves are mounted upon traveling shelves of the character herein described, they may be stacked in the truck in such a way that every bit of available space is employed. In addition to the advantage of being able to carry more loaves in a truck by the use of the mechanism herein described, it will be readily apparent that the job of delivering the contents will be made easier by the delivery man for the reason that as fast as the loaves are removed from the rear ends of the shelves, the other loaves thereon may be moved back into position to be conveniently reached by merely turning the shaft 31, thus making it unnecessary for the driver to crawl into the truck to reach the loaves at the front or to have to use poles or hooks to reach and pull to the rear bread receptacles such as are at present in use.

What is claimed is:—

1. A movable article support adapted to be secured within a truck body between side walls of the same, comprising a pair of beams adapted to be secured in spaced parallel relation within said body and to the inner face of the walls thereof, a shaft connecting said beams at one end of the body, sprocket wheels carried upon the ends of said shaft, a pair of independent sprocket wheel supports at the other end of the body and each secured to a beam, means for shifting said supports individually longitudinally of the beam, a sprocket wheel carried by each support, a pair of endless sprocket chains connecting the sprocket wheels of the said beams, means disposed between the sprocket wheels of the beams for supporting the top and bottom runs of the sprocket chains, an article carrier comprising a plurality of slat members disposed in side by side relation and connecting between said chains and each having an end secured to a link of a chain, and means for effecting the rotation of said shaft.

2. In a flexible article carrier of the character described, a pair of endless sprocket chains, rotary means supporting each of said sprocket chains whereby the same may be moved in parallel paths, an article carrier secured to and between said pair of chains and comprising a plurality of strips of flat material disposed in edge to edge relation, and means connecting each end of each strip with a link of a chain comprising a lateral extension of and formed integrally with the link.

3. A movable shelf structure for a delivery truck having spaced side walls, comprising a pair of rotatably mounted sprocket wheels disposed within said body adjacent a side wall thereof and separated longitudinally of the body, an endless sprocket chain connecting each pair of sprocket wheels, a shaft disposed at one end of said body and extending transversely thereof and supporting the adjacent oppositely disposed sprocket wheels, one of said oppositely disposed sprocket wheels having a hub provided with a slot extending in the direction of the axis of the wheel, a pin secured to said shaft and loosely engaging in said slot, means for effecting the rotation of said shaft, and a flat article supporting structure adapted to extend longitudinally within the body and comprising a plurality of flat strips disposed in edge to edge relation, said strips extending transversely of the body and each having an end secured to a link of an endless chain.

4. A movable article support adapted for installation within the body of a delivery truck, comprising a shaft disposed transversely of the body at one end thereof, a sprocket wheel carried upon each end of said shaft, means for effecting the rotation of the shaft, a sprocket wheel disposed within the body adjacent each side and at the end thereof remote from said shaft and alined with one of said first-mentioned sprocket wheels to form a pair, an endless sprocket chain connecting each pair of sprocket wheels, and a flexible article carrying body comprising a plurality of flat strips disposed in edge to edge relation and extending transversely of the body, means securing each end of said strips to a link of the chain adjacent thereto, and means facilitating the longitudinal adjustment of said strips whereby the width of the article carrier may be varied.

5. A movable article carrying support adapted to be disposed within a truck body between side walls thereof, comprising a pair of beams arranged in spaced parallel relation to extend longitudinally of the truck body and each secured to the inner side of a wall, means forming a pair of guide surfaces extending longitudinally of the inner side of each beam and in vertically spaced relation, said pair of surfaces of each beam terminating short of the ends of the beam, a shaft disposed transversely of the beams at one end of the body, a bearing bracket secured to each beam and supporting an end of the shaft, a sprocket wheel supported upon each end of the shaft, a bar member mounted at the other end of each of said beams and extending longitudinally of the same and disposed in a plane adjacent the inner sides of said guides, means for adjustably secured said bars longitudinally of the beams, a pivot pin carried by each of said bars, a sprocket wheel carried by each pivot pin, said sprocket wheels at the ends of said guides forming a pair, the tops and bottoms of said pairs of sprocket wheels being in the planes respectively of the adjacent upper and lower guides, a sprocket chain connecting each pair of sprocket wheels, a flexible article supporting body adapted to extend over and longitudinally of said beams throughout the lengths of the same and comprising a plurality of relatively narrow flat strips of material disposed in edge to edge relation and extending transversely of the body and a relatively broad flat plate at one end of the plurality of strips, said strips each having each end secured to a link of a chain and said plate having its ends secured to the chains, a back board pivotally attached to and extending transversely of said plate, and means for rotating said shaft, said plate and back board being adapted to be moved to the extreme forward end of the truck body when the carrier is in load receiving position.

6. A movable article carrying support adapted to be disposed within a supporting body between opposite walls thereof, comprising a pair of beams arranged in spaced parallel relation within said body and each secured to a wall, means forming a pair of guide surfaces extending longitudinally of the inner side of each beam and in vertically spaced relation, a shaft disposed transversely of the beams at one end of the body, bearing means carried by each beam and supporting an end of the shaft, a sprocket wheel supported upon each end of the shaft, a bar member mounted at the other end of each of the beams and extending longitudinally thereof and disposed in a plane adjacent the inner sides of said guides, means for adjustably securing said bars longitudinally of the beams, a sprocket wheel pivotally secured to each bar, the said sprocket wheels at the ends of the guides forming a pair and the tops and bottoms of said pairs of sprocket wheels being in the planes respective of the adjacent upper and lower guides, a sprocket chain connecting each pair of sprocket wheels, a flexible article supporting structure extending longitudinally of said beams throughout the lengths of the same and comprising a plurality of relatively narrow strips of material disposed in edge to edge relation and extending transversely with respect to the beams, and means securing each end of each strip to a link of a chain whereby the strips of the structure may pass around the sprocket wheels.

7. A movable carrier structure, comprising a pair of spaced parallel endless chains, spaced rotatable supports for each of said chains, a flexible carrier body extending longitudinally of the pair of chains and having opposite side edges extending across the chains, said carrier body being made up of a plurality of individual strips disposed in edge to edge relation, means securing each end of each strip to a link of the adjacent chain, and means which are so constructed and arranged that one of said rotatable bodies may have movement transversely of the carrier body to compensate for variations in the lengths of the strips, when such strips pass over the rotatable members.

8. A movable shelf structure, comprising a pair of spaced parallel endless chains, rotatable supporting means for the ends of each of said chains, the supporting means of one chain being in axial alinement with the supporting means of the other chain, means for effecting the simultaneous rotation of the chain supporting means, a carrier body disposed to extend lengthwise of and connect the two chains, said carrier body being made up of a plurality of strips disposed in edge to edge relation, means securing each end of each strip to a link of the adjacent chain, and means for increasing or decreasing the width of the carrier body to adjust the structure to a space of predetermined width.

9. A movable shelf structure, comprising a pair of spaced parallel endless chains, rotatable supporting means for the ends of each of said chains, the supporting means of one chain being in axial alinement with the supporting means of the other chain, means for effecting the simultaneous rotation of the chain supporting means, a carrier body disposed to extend lengthwise of and connect the two chains, said carrier body being made up of a plurality of strips disposed in edge to edge relation, means securing each end of each strip to a link of the adjacent chain, each of said strips being formed in two telescopically joined sections whereby the width of the carrying body may be increased or decreased as desired.

10. A movable article support for installation within a supporting structure between two spaced walls thereof, comprising a pair of beams disposed in spaced parallel relation and each secured to a wall, a shaft connecting said beams at one end of the support, a sprocket wheel secured to each end of said shaft, a block body secured to each of said beams adjacent its other end, said block bodies being upon the confronting faces of the beams, a bar member disposed in spaced parallel relation with each of said beams and extending across the block body secured thereto, said bar members having longitudinally extending slots, a securing pin passing through each of said slots into the adjacent block body, each of said bar members having a laterally turned end disposed upon the side of the adjacent block body remote from said shaft and extending toward the adjacent beam, an adjusting screw threaded through the laterally extended end of each bar and engaging the adjacent block body, a pivot pin carried upon the opposite end of each bar and extending toward the adjacent beam, a sprocket wheel supported upon each pivot pin, an endless chain coupling each of said last sprocket wheels with one of the first sprocket wheels, and a flexible carrying structure extending lengthwise of said chains and secured at its opposite edges to the chains to be moved longitudinally of said beams when said shaft is rotated.

CLYDE P. WAGNER.
CLIFFORD E. ALLEN.